(12) United States Patent
Accapadi et al.

(10) Patent No.: US 7,752,620 B2
(45) Date of Patent: Jul. 6, 2010

(54) ADMINISTRATION OF LOCKS FOR CRITICAL SECTIONS OF COMPUTER PROGRAMS IN A COMPUTER THAT SUPPORTS A MULTIPLICITY OF LOGICAL PARTITIONS

(75) Inventors: Jos M. Accapadi, Austin, TX (US); Andrew Dunshea, Austin, TX (US); Sujatha Kashyap, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 1430 days.

(21) Appl. No.: 11/146,453

(22) Filed: Jun. 6, 2005

(65) Prior Publication Data

US 2006/0277551 A1    Dec. 7, 2006

(51) Int. Cl.
*G06F 9/455* (2006.01)
*G06F 9/46* (2006.01)
*G06F 13/00* (2006.01)

(52) U.S. Cl. .......................... 718/1; 718/107; 711/150; 711/151; 711/152

(58) Field of Classification Search .................... 718/1, 718/100, 101, 107; 711/150–152
See application file for complete search history.

(56) References Cited

U.S. PATENT DOCUMENTS 6,067,591 A * 5/2000 Howard et al. .............. 710/100
6,697,834 B1 * 2/2004 Dice .......................... 718/102
2001/0036112 A1 * 11/2001 Igami et al. ................. 365/200
2003/0041090 A1 * 2/2003 Armstrong et al. .......... 709/106
2003/0079094 A1 * 4/2003 Rajwar et al. ............... 711/150

OTHER PUBLICATIONS

Vora et al. "A Variable Cache Consistency Protocol for Mobile System Using Time Locks)", Nov. 2003, Distributed Applications and Interoperable Systems, 4th IFIP WG 6.1 International Conference, pp. 153, 156, 158, 160, 162-166.*
U.S. Appl. No. 11/006,083, filed Dec. 7, 2004, Larry Brenner.
U.S. Appl. No. 10/996,307, filed Nov. 23, 2004, Jos Accapadi et al.
U.S. Appl. No. 11/011,248, filed Dec. 14, 2004, Dean Burdick et al.
U.S. Appl. No. 10/455,108, filed Jun. 5, 2003, Larry Brenner et al.
Browning; Scheduling Enhancement-Process Locking; TDBS; Aug. 1996; pp. 227-230; v39, n8; US.
Browning; New Locking Strategy; TDBS; Dec. 1996; pp. 125-126; v39, n12; US.

* cited by examiner

*Primary Examiner*—Meng-Ai An
*Assistant Examiner*—Willy W Huaracha
(74) *Attorney, Agent, or Firm*—Edward J. Lenart; Justin Dillon; Biggers & Ohanian LLP.

(57) ABSTRACT

Administration of locks for critical sections of computer programs in a computer that supports a multiplicity of logical partitions that include determining by a thread executing on a virtual processor executing in a time slice on a physical processor whether an expected lock time for a critical section of the thread exceeds a remaining entitlement of the virtual processor in the time slice and deferring acquisition of a lock if the expected lock time exceeds the remaining entitlement.

12 Claims, 7 Drawing Sheets

ADMINISTRATION OF LOCKS FOR CRITICAL SECTIONS OF COMPUTER PROGRAMS IN A COMPUTER THAT SUPPORTS A MULTIPLICITY OF LOGICAL PARTITIONS

BACKGROUND OF THE INVENTION

1. Field of the Invention

The field of the invention is data processing, or, more specifically, methods, systems, and products for administration of locks for critical sections of computer programs in a computer that supports a multiplicity of logical partitions.

2. Description of Related Art

A thread is a unit of software execution on a multi-threaded computer. That is, a thread is an executable entity of work in a computer system. A thread can be viewed as a separate stream of executable computer program instructions. On such a computer, software programs are executed in units of execution called 'processes' that include all the processor registers, code segment and offset registers, data segment and offset registers, stack segment and offset registers, flag registers, instruction pointer registers, program counters, and so on, needed for execution of software programs. For efficiency, 'processes' are organized further as threads, where each thread of a process individually possesses all the attributes needed for execution except that a thread shares memory among all the other threads of a process, thereby reducing the overhead of operating system switches from thread to thread ('context switches').

Threads of a process share the same memory space and are capable of reading and writing to the same memory addresses. Moreover, a thread reading a memory address may suffer an interrupt between any two computer program instructions, and there is no guarantee that a processor will regain run status before another thread writes to the same memory address. Such a situation is called a 'race condition.' A race condition can occur when more than one thread can simultaneously access shared memory, and the threads can both read and modify the data in memory. A common way to prevent race conditions is called 'mutual exclusion' or 'mutex.' In mutual exclusions, portions of code where shared data are read or modified are defined as 'critical sections,' and some mechanism is implemented to guarantee that two threads will never be in a critical section for the same shared data at the same time.

A mechanism that guarantees that two threads will never be in a critical section for the same shared data at the same time is referred to in this specification as a 'lock.' Examples of locks include Unix semaphores, monitor classes in C++, and synchronized methods in Java. A thread that requests exclusive access to a critical section for shared data is said to request a lock; requesting a lock is typically implemented with a system call which, if the lock is not immediately available, places the requesting thread in wait state until the lock becomes available. A thread that has exclusive access to a critical section for shared data is said to hold the lock.

Locks are amenable to convoy effects. Only one thread at a time can gain possession of a lock. A convoy occurs when a number of threads request access to the same lock. All requesting threads may experience context switches from run state to wait state. They may leave wait state, return to ready state, compete for possession of a processor, again request the lock, and, if it is not available, again return to wait state—to start the whole process all over again. The traditional remedy is to minimize the size of critical sections of computer program instructions, so that a lock-holder only retains the lock for the minimum amount of time necessary to carry out the pertinent data processing. This is not a complete solution, however, and, when convoy effects occur, they are particularly detrimental to overall computer system performance.

A logical partition ('LPAR') is a set of data structures and services that enables distribution of computer resources within a single computer to make the computer function as if it were two or more independent computers. A hypervisor is a layer of system software that runs under operating systems in logical partitions to schedule virtual processors on physical processors. A virtual processor is a subsystem that implements assignment of processor time to a logical partition. A shared pool of physical processors supports the assignment of partial physical processors (in time slices) to a logical partition. Such partial physical processors shared in time slices are referred to as 'virtual processors.' A thread is said to run on a virtual processor when it is running on the virtual processor's time slice. Sub-processor partitions time-share a physical processor among a set of virtual processors, in a manner that is invisible to an operating system running in a logical partition. Unlike multiprogramming within the operating system where a thread can remain in control of the physical processor by running in interrupt-disabled mode, in subprocessor partitions, the thread is still pre-empted by the hypervisor at the end of its virtual processor's time-slice, in order to make the physical processor available to a different virtual processor.

Thus, in a sub-processor partition, if a thread were to acquire a lock (even under interrupt-disabled conditions), there is no guarantee that the lock will be released before the thread gives up control of the physical processor. This often leads to long delays between lock acquisition and release, because the lock can only be released after the thread regains control of a physical processor in order to complete execution of its critical section. These long delays exacerbate lock contention within a partition, because other virtual processors vying for the lock are forced to wait until the lock-holding virtual processor regains control of a physical processor and releases the lock.

SUMMARY OF THE INVENTION

Methods, systems, and computer program products are disclosed for administration of locks for critical sections of computer programs in a computer that supports a multiplicity of logical partitions that include determining by a thread executing on a virtual processor executing in a time slice on a physical processor whether an expected lock time for a critical section of the thread exceeds a remaining entitlement of the virtual processor in the time slice and deferring acquisition of a lock if the expected lock time exceeds the remaining entitlement.

The foregoing and other objects, features and advantages of the invention will be apparent from the following more particular descriptions of exemplary embodiments of the invention as illustrated in the accompanying drawings wherein like reference numbers generally represent like parts of exemplary embodiments of the invention.

DETAILED DESCRIPTION OF EXEMPLARY EMBODIMENTS

Exemplary methods, systems, and products for administration of locks for critical sections of computer programs in a computer that supports a multiplicity of logical partitions according to embodiments of the present invention are described with reference to the accompanying drawings, beginning with FIG. 1. Administration of locks for critical sections of computer programs in a computer that supports a multiplicity of logical partitions according to embodiments of the present invention is implemented upon automated computing machinery, that is, on one or more computers. For further explanation, therefore, FIG. 1 sets forth a block diagram of automated computing machinery comprising an exemplary computer (152) useful in administration of locks for critical sections of computer programs in a computer that supports a multiplicity of logical partitions according to embodiments of the present invention. The computer (152) of FIG. 1 includes several physical processors (156) as well as random access memory ("RAM") (168) which is connected through a system bus (160) to the physical processors and to other components of the computer.

Stored in RAM (168) is a logical partition (104), an application program (158), a virtual processor (122), an operating system (154), a logical processor (106), a thread (182), and a hypervisor (102). As mentioned above, a logical partition ('LPAR') (104) is a set of data structures and services that enables distribution of computer resources within a single computer to make the computer function as if it were two or more independent computers. Each logical partition is assigned all the resources it needs to operate as though it were an independent computer, including processor time, memory, an operating system, and so on. An application program (158) is computer program instructions for user-level data processing implementing threads of execution.

A virtual processor (122) is a subsystem, data structures and computer program instructions, that implements assignment of processor time to a logical partition. A shared pool of physical processors supports the assignment of partial physical processors (in time slices) to a logical partition. Such partial physical processors shared in time slices are referred to as 'virtual processors.' A thread is said to run on a virtual processor when it is running on the virtual processor's time slice.

Physical processors held in a shared processing pool are shared among logical partitions. In the examples in this specification, physical processors are shared according to processing units with 1.0 processing units representing the processing capacity of one physical processor. In the example of FIG. 1, thread (182) is shown running on virtual processor (122), illustrating the time slice of logical partition (104) on which thread (182) runs.

A logical processor (106) is an operating system's structure for scheduling threads for execution. It represents a portion of the resources of a processor that is capable of carrying out the execution of a thread.

An operating system (154) is a layer of system software that schedules threads and provides functions for making system resources available to threads, including memory access, access to input/output resources, and so on. Operating systems also control allocation and authorization for access to computer resources. Operating systems perform low-level, basic tasks, such as recognizing input from a keyboard, sending output to a display screen, keeping track of files and directories on a magnetic disk drive, and controlling peripheral devices such as disk drives and printers. The operating system is also responsible for security, ensuring that unauthorized users do not access the system and that threads access only resources they are authorized to access. Operating systems useful for administration of locks for critical sections of computer programs in a computer that supports a multiplicity of logical partitions according to embodiments of the present invention are multi-threading operating systems, examples of which include UNIX™, Linux™, Microsoft XP™, AIX™, IBM's i5/OS™, and many others as will occur to those of skill in the art.

Figure 1:
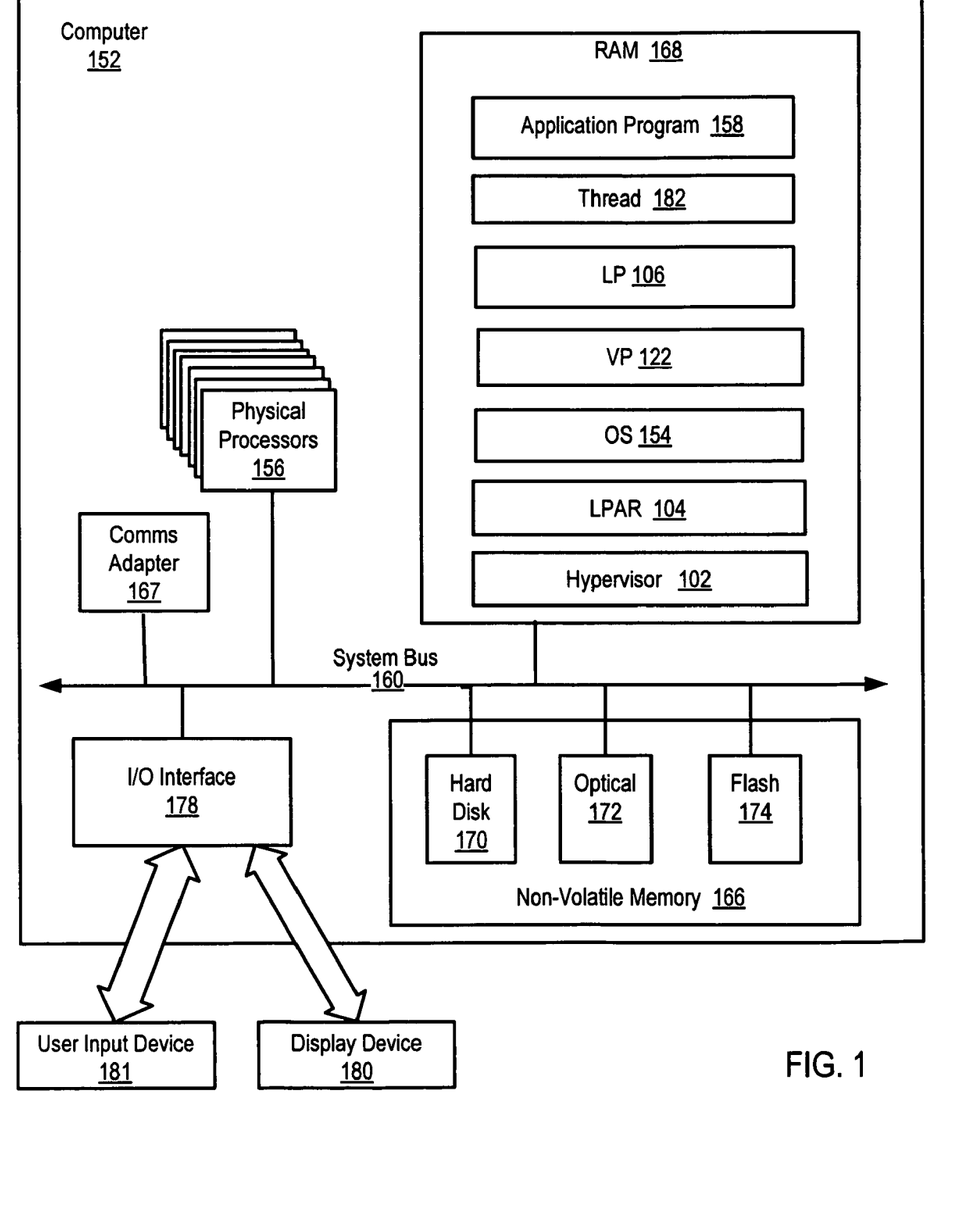
FIG. 1 sets forth a block diagram of automated computing machinery comprising an exemplary computer useful in administration of locks for critical sections of computer programs in a computer that supports a multiplicity of logical partitions according to embodiments of the present invention.

The hypervisor (102) of FIG. 1 is a layer of system software that runs under operating systems in logical partitions. That is, a hypervisor (102) runs between an operating system and underlying physical computer components—including physical processors. It is the function of the hypervisor, among other things, is to schedule virtual processors on physical processors. In the example of FIG. 1, hypervisor (102) is computer program instructions capable of administration of locks for critical sections of computer programs in a computer that supports a multiplicity of logical partitions according to embodiments of the present invention.

Thread (182) is computer program instructions capable of administration of locks for critical sections by determining whether an expected lock time for a critical section exceeds a remaining entitlement of a virtual processor upon which the thread is dispatched. Thread (182) may defer acquisition of the lock if the expected lock time exceeds the remaining entitlement. Hypervisor (102) is improved according to embodiments of the present invention to provide to thread (182) the expected lock time for the critical section. Hypervisor (102) may calculate the expected lock time as an average lock time for the lock across threads or as an average lock time for all locks on the computer system. Hypervisor (102) also provides the virtual processor's total entitlement in the time slice to thread (182). Hypervisor (102) may identify to thread (182) the portion of the entitlement that has been used in the time slice.

Hypervisor (102), virtual processor (122), logical partition (104), operating system (154), application program (158), thread (182), and logical processor (106) in the example of FIG. 1 are shown in RAM (168). Readers of skill in the art, however, will recognize that many components of such software may be stored in non-volatile memory (166) also. Computer (152) of FIG. 1 includes non-volatile computer memory (166) coupled through a system bus (160) to processors (156) and to other components of the computer (152). Non-volatile computer memory (166) may be implemented as a hard disk drive (170), optical disk drive (172), electrically erasable programmable read-only memory space (so-called 'EEPROM' or 'Flash' memory) (174), RAM drives (not shown), or as any other kind of computer memory as will occur to those of skill in the art.

The example computer of FIG. 1 includes one or more input/output interface adapters (178). Input/output interface adapters in computers implement user-oriented input/output through, for example, software drivers and computer hardware for controlling output to display devices (180) such as computer display screens, as well as user input from user input devices (181) such as keyboards and mice.

The exemplary computer (152) of FIG. 1 includes a communications adapter (167) for implementing data communications with other computers. Such data communications may be carried out, for example, through data communications networks such as IP networks—and in other ways as will occur to those of skill in the art. Communications adapters implement the hardware level of data communications through which one computer sends data communications to another computer, directly or through a network. Examples of communications adapters useful for determining availability of a destination according to embodiments of the present invention include modems for wired dial-up communications, Ethernet (IEEE 802.3) adapters for wired network communications, and 802.11b adapters for wireless network communications.

Figure 2:
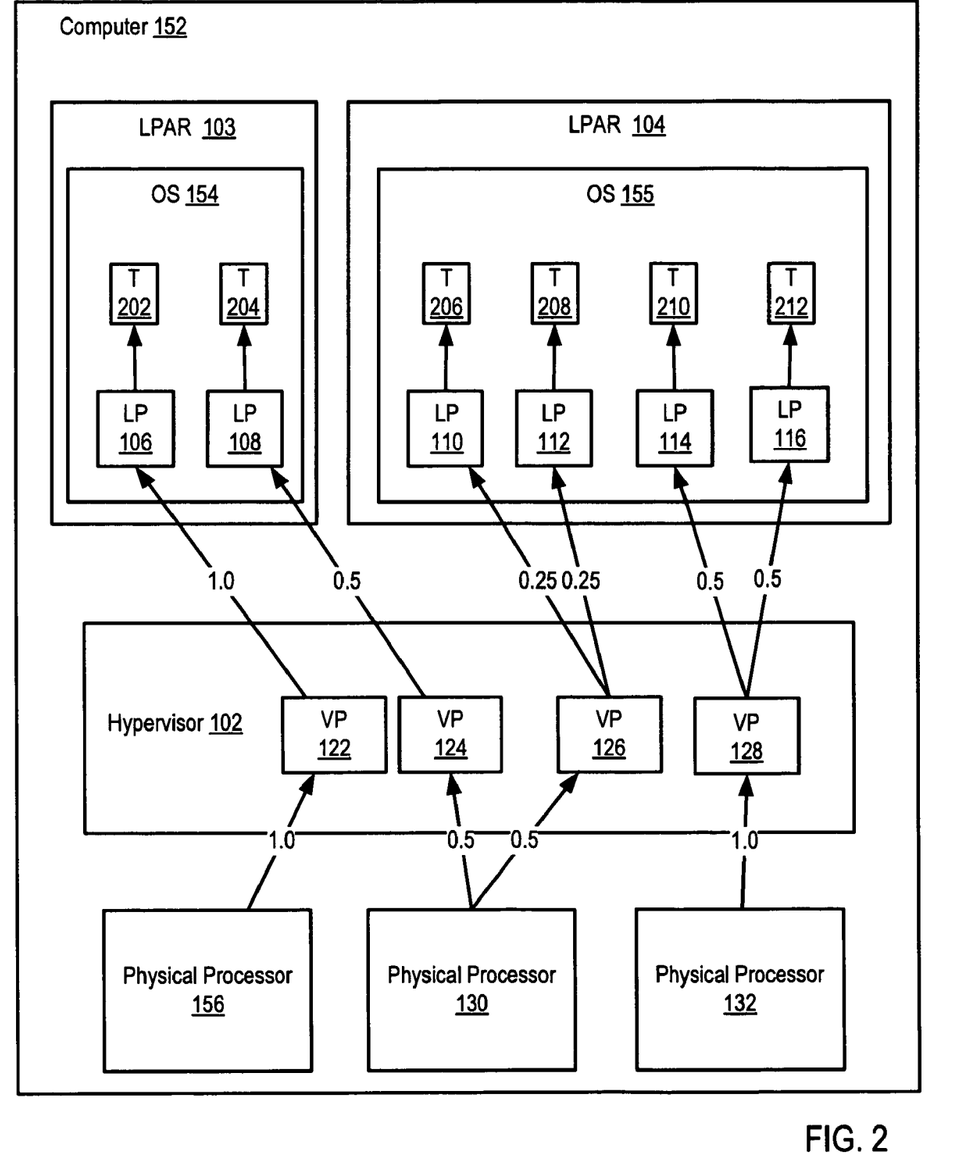
FIG. 2 sets forth a functional block diagram illustrating an exemplary system for administration of locks for critical sections of computer programs in a computer that supports a multiplicity of logical partitions according to embodiments of the present invention.

For further explanation, FIG. 2 sets forth a functional block diagram illustrating an exemplary system for administration of locks for critical sections of computer programs in a computer that supports a multiplicity of logical partitions according to embodiments of the present invention. The system of FIG. 2 includes LPAR (103) and LPAR (104). The system of FIG. 2 includes two operating systems (154, 155), one each in LPAR (103) and LPAR (104) respectively. The system of FIG. 2 includes six logical processors (106-116), two for operating system (154) in LPAR (103) and four for operating system (155) in LPAR (104). Six threads (202-212) run on the six logical processors (106-116) respectively, one thread per logical processor. The system of FIG. 2 includes a hypervisor (102) and four virtual processors, two virtual processors (122, 124) assigned to LPAR (103) and two virtual processors (126, 128) assigned to LPAR (104).

The system of FIG. 2 also includes three physical processors (156, 130, 132). In this example, the processing capacity of the three physical processors (156, 130, 132) is apportioned to the LPARs as follows:

All of the processing capacity of physical processor (156) is assigned entirely to virtual processor (122), so that logical processor (106) has available to it the entirety of physical processor (156).

One-half the processing capacity of physical processor (130) is assigned to virtual processor (124), so that logical processor (108) has available to it in time slices one-half of physical processor (130).

One-half the processing capacity of physical processor (130) is assigned to virtual processor (126). Virtual processor (126) is assigned to LPAR (104) which runs in SMT mode with two logical processors (110, 112) for virtual processor (126). Logical processor (110) and logical processor (112) each has available to it in time slices one-fourth of the processing capacity of physical processor (130).

All of the processing capacity of physical processor (132) is assigned to virtual processor (128). Virtual processor (128) is assigned to LPAR (104) which runs in SMT mode with two logical processors (114, 116) for virtual processor (128). Logical processor (114) and logical processor (116) each has available to it in time slices one-half of the processing capacity of physical processor (132).

The hypervisor (102) schedules the virtual processors on the physical processors. The operating systems schedule threads and logical processors. The fact that a virtual processor is removed from run state to ready state, thereby losing control of a physical processor for a period of time, is unknown to the operating system to which the virtual processor is assigned. Any thread holding a lock for a critical section when its corresponding virtual processor loses control of the physical processor retains the lock until the virtual processor regains the physical processor and the thread completes its critical section. While the virtual processor waits to regain the physical processor, many other threads may need the same lock for their critical sections, and all of them will have to wait, creating a clear convoy effect and slowing overall system performance.

The threads in this example, however, are improved according to embodiments of the present invention to be capable of determining whether an expected lock time for a critical section of the thread exceeds a remaining entitlement of a virtual processor upon which the thread is executing. Such threads may defer acquisition of the lock if the expected lock time exceeds the remaining entitlement. Hypervisor (102) is improved according to embodiments of the present invention to provide to a thread the expected lock time for the critical section. Hypervisor (102) may calculate the expected lock time as an average lock time for the lock across threads or as an average lock time for all locks on the computer system. Hypervisor (102) also provides the virtual processor's total entitlement in the time slice to a thread. Hypervisor (102) may identify to a thread the portion of the entitlement that has been used in the time slice.

The number, arrangement, and assignments of physical processors, virtual processors, and logical processors in the system of FIG. 2 are for explanation only, and not for a limitation of the present invention. A system for administration of locks for critical sections of computer programs in a computer that supports a multiplicity of logical partitions may include any number, arrangement, or assignment of physical processors, virtual processors, and logical processors.

Figure 3A:
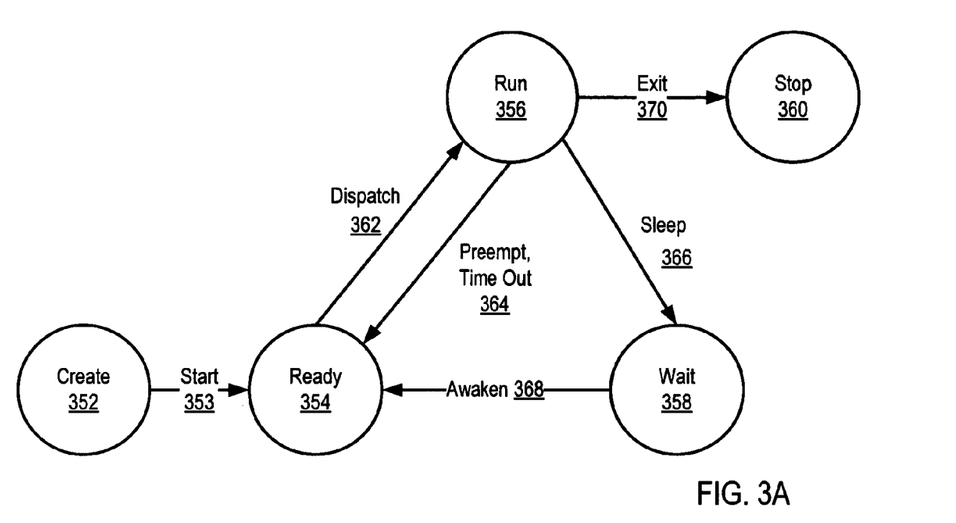
FIG. 3A sets forth a state diagram illustrating exemplary thread states for administration of locks for critical sections of computer programs in a computer that supports a multiplicity of logical partitions according to embodiments of the present invention.

For further explanation, FIG. 3A sets forth a state diagram illustrating exemplary thread states for administration of locks for critical sections of computer programs in a computer that supports a multiplicity of logical partitions according to embodiments of the present invention. The bubbles in FIG. 3A represent thread states. The arrows between the bubbles represent state transitions effected by operating system functions. The thread states represented in FIG. 3A include a create state (352), a ready state (354), a run state (356), a wait state (358), and a stop state (360). A thread resides temporarily in the create state (352) when the thread is first created at the request of another thread, to give the operating system time to gather information and resources for the thread. As soon as the operating system prepares the thread to run, it is 'started' (353), that is, moved to the ready state (354). A thread in run state (356) can exit (370) the run state (356) and enter stop state (360).

Threads in the ready state (354) are queued, in a 'ready queue,' waiting for an opportunity to run. The operating system function for moving a thread from ready state to run state is called dispatching (362). When a thread is dispatched, that is, in run state (356), the thread is presently assigned to execute on a logical processor. Whether the thread is physically executing depends on whether the logical processor's virtual processor is currently dispatched through its hypervisor, that is, currently executing in a time slice on a physical processor. Only one thread at a time is placed in run state on a logical processor.

Threads can lose possession of the logical processor, be removed from run state to ready state, by preemption or time out (364). A thread is preempted when a thread having a higher priority enters the ready queue for the logical processor. A thread times out if it retains possession of the logical processor, that is, remains in run state, through its entire time slice.

A thread also may leave run state (356) by issuing a system call and entering wait state (358)—to wait for completion of the system call. Such system calls include intentional requests to sleep (366) or wait for a certain period of time, lock requests, requests for data to be read from or written to disk, requests for data to be read from or written to input/output resources, and so on. In the example of FIG. 3A, a thread executing on a logical processor may defer acquisition of a lock by issuing a request to sleep for the duration of the remaining time slice of the logical processor's virtual processor.

The process of returning the thread from wait state to ready state is referred to as awakening (368) the thread. A thread in wait state (358) awaiting a lock may awaken (368) when the requested lock is released by a lock holder. More than one thread may be queued in wait state (358) waiting for the same lock. The queue can represent a delay in processing the program that generated the threads. The administration of locks for critical sections of computer programs in a computer that supports a multiplicity of logical partitions according to embodiments of the present invention can decrease the delay in processing programs by reducing the time that threads spend in wait state (358) awaiting the release of locks. In the example of FIG. 3A, a thread executing on a virtual processor executing in a time slice on a physical processor may determine whether an expected lock time for a critical section of the thread exceeds a remaining entitlement of the virtual processor in the time slice. The thread may defer acquisition of a lock if the expected lock time exceeds the remaining entitlement. The thread's deferral of acquisition of the lock can reduce the size of the wait state queue. Other threads may acquire the lock instead, and avoid the wait state. If, instead, the thread acquired the lock, it may not complete the critical section before expiration of the virtual processor's time slice. If it did not complete the critical section, the thread would continue to hold the lock until the virtual processor's next time slice. All other threads requesting the lock between the time the thread acquired the lock and the virtual processor's next time slice would be unable to acquire the lock and would enter the wait state.

Figure 3B:
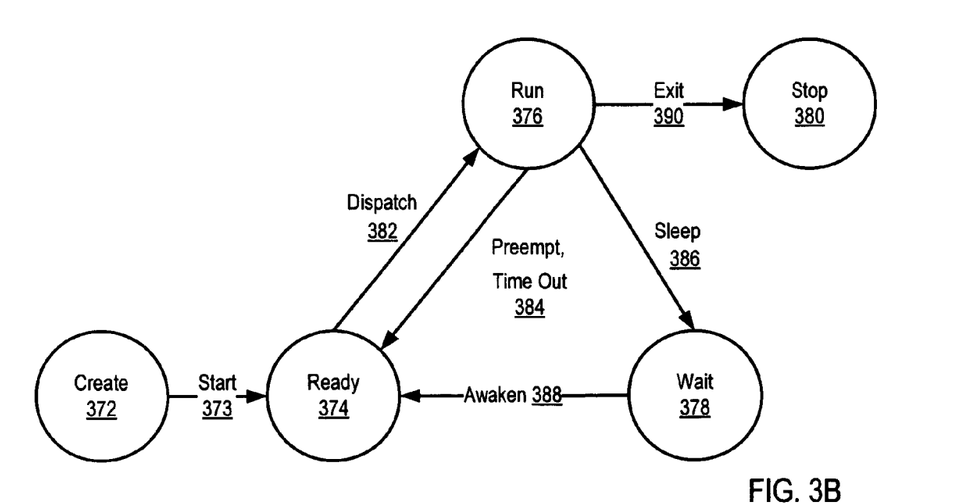
FIG. 3B sets forth a state diagram illustrating exemplary virtual processor states for administration of locks for critical sections of computer programs in a computer that supports a multiplicity of logical partitions according to embodiments of the present invention.

For further explanation, FIG. 3B sets forth a state diagram illustrating exemplary virtual processor states for administration of locks for critical sections of computer programs in a computer that supports a multiplicity of logical partitions according to embodiments of the present invention. The bubbles in FIG. 3B represent virtual processor states. The arrows between the bubbles represent state transitions effected by hypervisor functions. The virtual processor states represented in FIG. 3B include a create state (372), a ready state (374), a run state (376), a wait state (378), and a stop state (380). A virtual processor resides temporarily in the create state (372) when the virtual processor is first created, typically at boot time, to give the hypervisor time to gather information and resources for the virtual processor. The hypervisor may maintain a processor utilization resource register for the virtual processor. When the virtual processor was first created, the hypervisor may store in the register the virtual processor's entitlement usage for the time slice. The hypervisor may also store the current use in the time slice of the virtual processor, or 0 at the time of creation. As soon as the hypervisor prepares the virtual processor to run, the virtual processor is 'started' (373), that is, moved to the ready state (374). A hypervisor can exit (390) a virtual processor in the run state (376) and place it in stop state (380).

Virtual processors in the ready state (374) are queued, in a 'ready queue,' waiting for an opportunity to run. Only one virtual processor at a time is placed in run state on a physical processor.

Virtual processors can lose possession of the physical processor and be removed from run state to ready state, by preemption, time out, or by being forced out (384). A virtual processor is preempted when a virtual processor having a higher priority enters the ready queue for the physical processor. A virtual processor times out if it retains possession of the physical processor, that is, remains in run state, through its entire time slice. A virtual processor also may leave run state (376) by issuing a system call and entering wait state (378)—to wait for completion of the system call. One such system call is a sleep (386) request. Returning the virtual processor from wait state to ready state is referred to as awakening (388) the virtual processor.

In the example of FIG. 3B, a thread running on a virtual processor that is scheduled by the hypervisor may encounter a critical section and need a lock. Hypervisor provides to the thread the expected lock time for the critical section and may also provide the virtual processor's remaining entitlement in the time slice to thread or information from which remaining entitlement can be calculated by the thread. The thread can decide whether to defer acquisition of the lock by determining whether the expected lock time exceeds the remaining entitlement of the virtual processor in its time slice. A thread that does acquire a lock after determining that an expected lock time exceeds the remaining entitlement of a virtual processor in its time slice has a greater chance of completing its critical section before its virtual processor times out, thereby reducing the risk of convoy effects among threads waiting for the lock.

Figure 4:
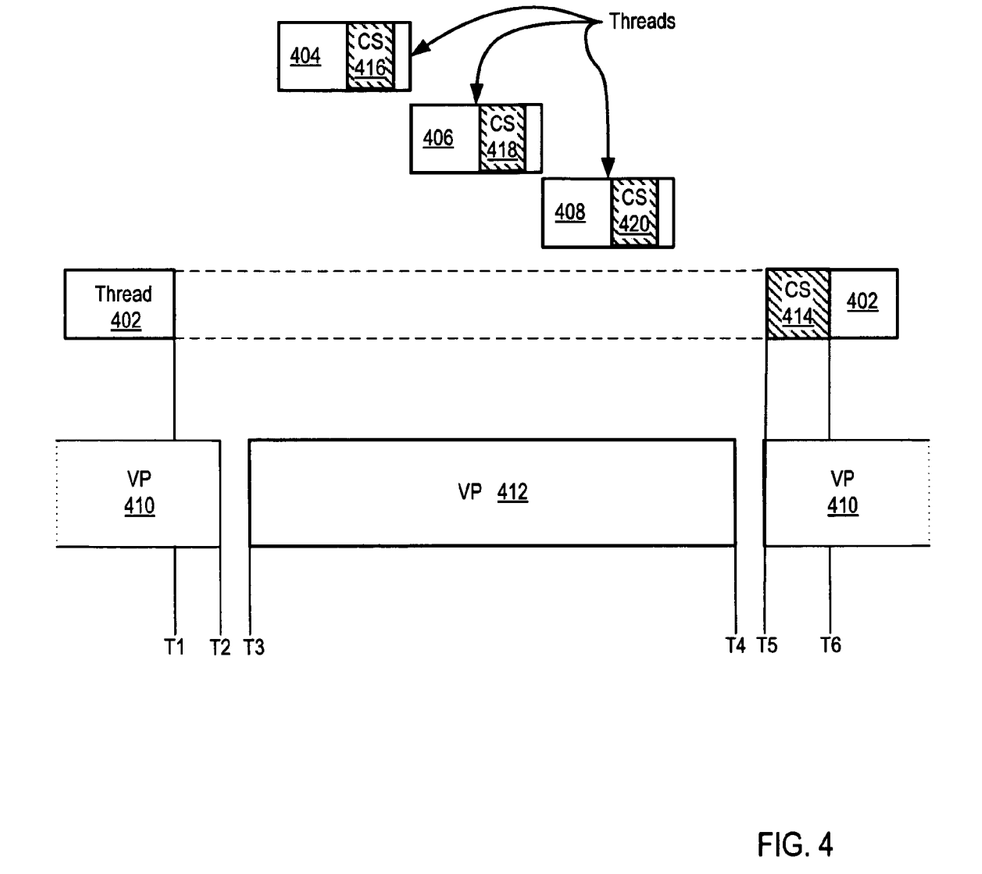
FIG. 4 sets forth a timing diagram illustrating an exemplary sequence of execution among four threads and two virtual processors that administer locks for critical sections of computer programs according to embodiments of the present invention.

For further explanation, FIG. 4 sets forth a timing diagram illustrating an exemplary sequence of execution among four threads (402-408) and two virtual processors (410, 412) that administer locks for critical sections of computer programs according to embodiments of the present invention. The virtual processors (410, 412) in this example run in sequential time slices on the same underlying physical processor (not shown). Threads (402-408) have critical sections (414-420) respectively. Each thread requires the same lock for its critical section.

Thread (402) runs on virtual processor (410) and encounters its critical section at time T1. Virtual processor (410) at time T1 has remaining entitlement to its physical processor T2-T1. The expected lock time for the critical section (414) of thread (402) is T6-T5, a period of time that is greater than the remaining entitlement T2-T1 of virtual processor (410). Thread (402) in this example is improved according to embodiments of the present invention to determine whether an expected lock time for a critical section of the thread exceeds a remaining entitlement of the virtual processor in a time slice and defer acquisition of a lock if the expected lock time exceeds the remaining entitlement. In this example, therefore, thread (402) defers acquisition of the lock from time T1 until time T5, sleeping through the remaining entitlement of its virtual processor during the virtual processor's current time slice.

Virtual processor (410) loses possession of its physical processor at time T2 and regains the physical processor at time T5. Virtual processor (412) runs on the physical processor from time T3 until T4. Between T3 and T4, threads (404, 406, and 408) each encounters its critical section (416, 418, and 420 respectively) and acquires the same lock that thread (402) deferred. If thread (402) had not deferred acquisition of the lock, threads (404, 406, and 408) would all have to wait until at least time T6 for the lock.

Figure 5:
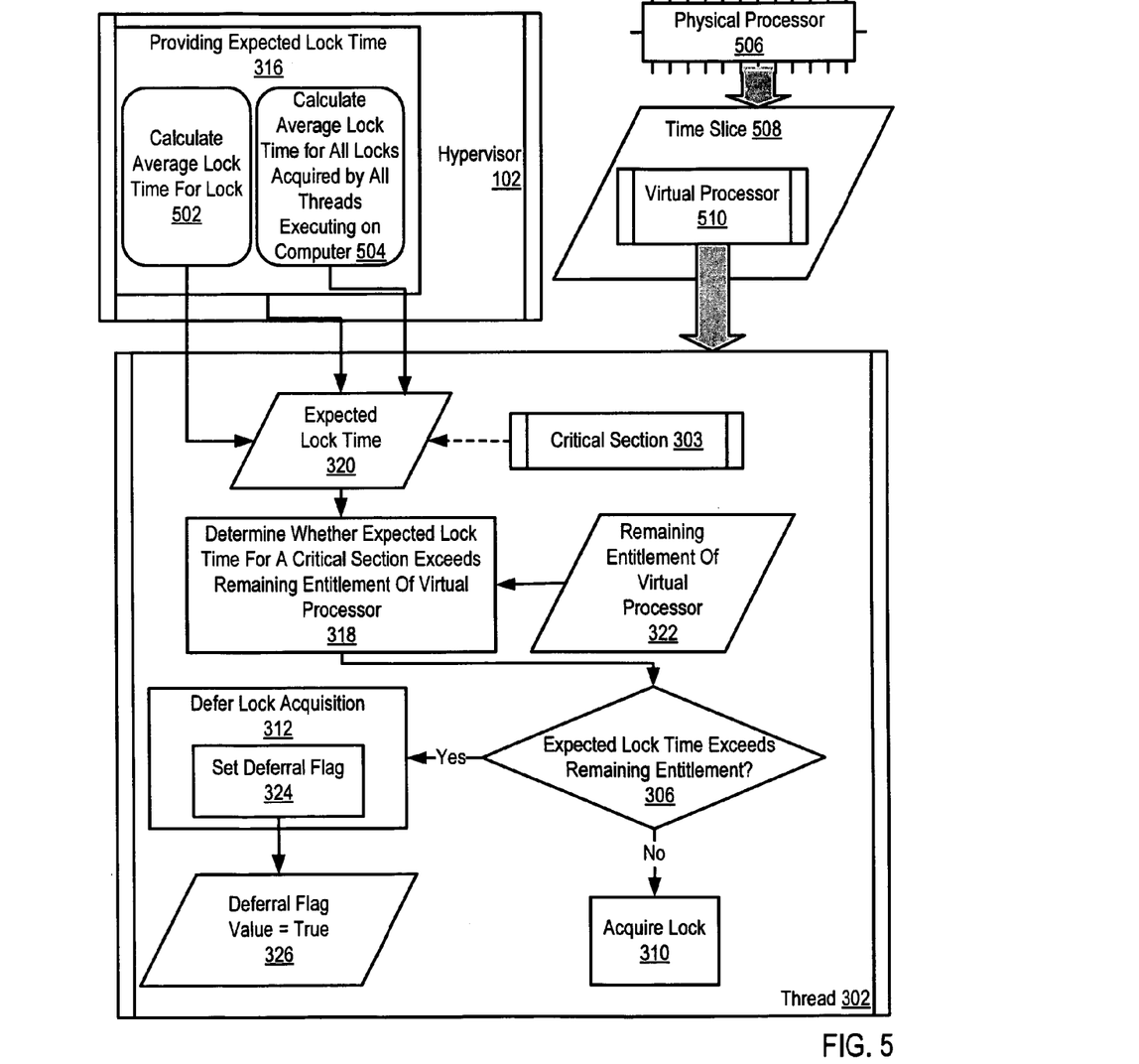
FIG. 5 sets forth a flow chart illustrating an exemplary method for administration of locks for critical sections of computer programs in a computer that supports a multiplicity of logical partitions.

For further explanation, FIG. 5 sets forth a flow chart illustrating an exemplary method for administration of locks for critical sections of computer programs in a computer that supports a multiplicity of logical partitions. The method of FIG. 5 includes determining (318) by a thread (302) executing on a virtual processor (510) executing in a time slice (508) on a physical processor (506) whether an expected lock time (320) for a critical section (303) of the thread exceeds a remaining entitlement (322) of the virtual processor in the time slice.

A thread (302) may determine the remaining entitlement (322) of virtual processor (510) by subtracting the amount of time the virtual processor (510) has been running in the virtual processor's current time slice from the virtual processor's total entitlement in the time slice. Hypervisor (102) may provide thread (302) with the remaining entitlement (322) of the virtual processor in the time slice. Hypervisor (102) may maintain in a register the amount of time a virtual processor has been running in the virtual processor's current time slice. IBM's POWER5 Hypervisor, for example, maintains and updates a register called a Processor Utilization Resource Register (PURR) for each virtual processor. The PURR for a virtual processor contains the amount of time the virtual processor has been running in the virtual processor's current time slice, that is, the portion of the total entitlement that has already been used in the current time slice. The hypervisor may maintain a register containing the virtual processor's total entitlement to the current time slice—or otherwise make the total entitlement available to threads. The hypervisor (102) may also provide an expected lock time (320) for the critical section to the thread (302).

The method of FIG. 5 further includes deferring (312) acquisition of a lock if the expected lock time (320) exceeds the remaining entitlement (322). To defer lock acquisition, the thread may issue a system call to sleep for at least the remainder of virtual processor's time slice. The thread then enters the wait state, and will not return to the running state during the virtual processor's current time slice.

In the example of FIG. 5, deferring (312) acquisition of a lock may also include setting (324) the value of a deferral flag to true (326), thereby commemorating the fact that the lock has been previously deferred at least once. A deferral flag may be implemented as a Boolean value or an integer which may be 'set' by setting its value to 'TRUE' or to 1.

The method of FIG. 5 further includes acquiring (310) the lock if the expected lock time (320) does not exceed the remaining entitlement (322). Thread (302) can acquire the lock by requesting the lock. Requesting the lock is typically implemented with a system call such as a request for a semaphore in C or C++, or by a call to a Java synchronized method, for example. If the lock is immediately available, thread (302) executes the critical section. If the lock is not immediately available, thread (302) enters wait state until the lock becomes available.

The method of FIG. 5 further includes providing (316), by a hypervisor (102) to the thread (302), the expected lock time (320). In the method of FIG. 5, providing (316) the expected lock time (320) may be carried out by calculating (502) an average lock time for the lock. For example, hypervisor (102) may average the execution times of threads on critical sections protected by the lock. Alternatively in the method of FIG. 5, providing (316) the expected lock time (320) may be carried out by calculating (504) an average lock time for all locks acquired by all threads executing on the computer. For example, hypervisor (102) may average the execution times of all threads on all critical sections. These methods of providing an expected lock time to a thread are for explanation only, and are not a limitation of the present invention. Administration of locks for critical sections of computer programs in a computer that supports a multiplicity of logical partitions may include a thread obtaining the expected lock time by other means, as will occur to those of skill in the art. For example, the expected lock time may be left as a system configuration parameter, thereby allowing for performance tuning. In another alternative, an application program could maintain for itself the average lock time of its own threads. For example, the application program may average the execution times of threads on critical sections protected by the each lock. Each time a thread generated by the application program entered a critical section, the thread may begin a timer. When the thread exited the critical section, it may report the amount of time spent executing the critical section and the identity of the lock to the application program. The application program could then maintain a table of average lock times for the locks encountered by threads generated by the application program. Other ways of providing expected lock times may occur to those of skill in the art, and all such ways are well within the scope of the present invention.

Similarly, the comparison of a value for expected lock time (320) and a value for remaining entitlement (322) of the virtual processor in the time slice in the example of FIG. 5 is for illustration and is not a limitation of the present invention. Administration of locks for critical sections of computer programs in a computer that supports a multiplicity of logical partitions may include other methods of determining whether an expected lock time (320) for a critical section (303) of the thread exceeds a remaining entitlement (322) of the virtual processor in the time slice. For example, a hypervisor (102) may set a wait bit prior to the expiration of the virtual processor's time slice, and the thread (182) may examine the wait bit before acquiring a lock. If the wait bit is set, the thread may defer lock acquisition. The decision how far in advance of the entitlement expiration this bit should be set can be tunable, or it could be set or calibrated based on performance data for a particular system configuration.

Figure 6:
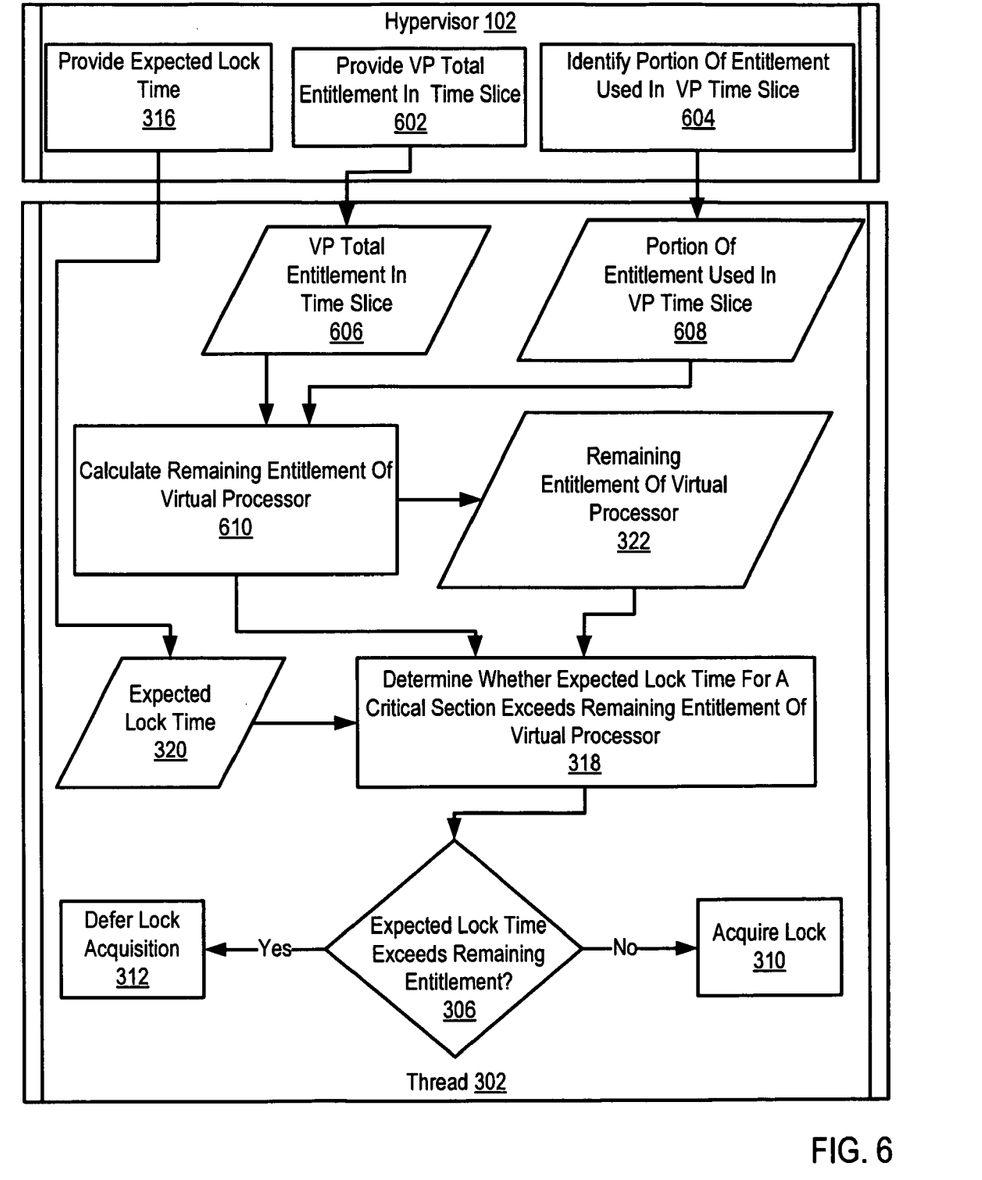
FIG. 6 sets forth a flow chart illustrating a further exemplary method for administration of locks for critical sections of computer programs in a computer that supports a multiplicity of logical partitions.

For further explanation, FIG. 6 sets forth a flow chart illustrating a further exemplary method for administration of locks for critical sections of computer programs in a computer that supports a multiplicity of logical partitions. The method of FIG. 6 is similar to the method of FIG. 5. That is, the method of FIG. 6 includes determining (318) by a thread (302) executing on a virtual processor (510) executing in a time slice (508) on a physical processor (506) whether an expected lock time (320) for a critical section (303) of the thread exceeds a remaining entitlement (322) of the virtual processor in the time slice and deferring (312) acquisition of a lock if the expected lock time (320) exceeds the remaining entitlement (322), all carried out in a similar manner as the method of FIG. 5. The method of FIG. 6, however, also includes providing (602), by a hypervisor (102) to the thread (302), the virtual processor's total entitlement (606) in the time slice. The method of FIG. 6 also includes identifying (604), by the hypervisor (102) to the thread (302), a portion (608) of the entitlement that has been used in the time slice. Hypervisor (102) may maintain in a register the amount of time a virtual processor has been running in the virtual processor's current time slice, such as, for example, the PURR register described above. The hypervisor may maintain a register containing the virtual processor's total entitlement to the current time slice—or otherwise make the total entitlement available to threads. The hypervisor (102) may also provide an expected lock time (320) for the critical section to the thread (302).

The method of FIG. 6 further includes calculating (610) by the thread (302) the remaining entitlement (322) of the virtual processor in the time slice in dependence upon the virtual processor's total entitlement (606) and the portion of the entitlement that has been used (608). The thread can subtract the portion of the entitlement that the virtual processor has consumed from the virtual processor's total entitlement (606). The difference is the virtual processor's remaining entitlement (322).

Figure 7:
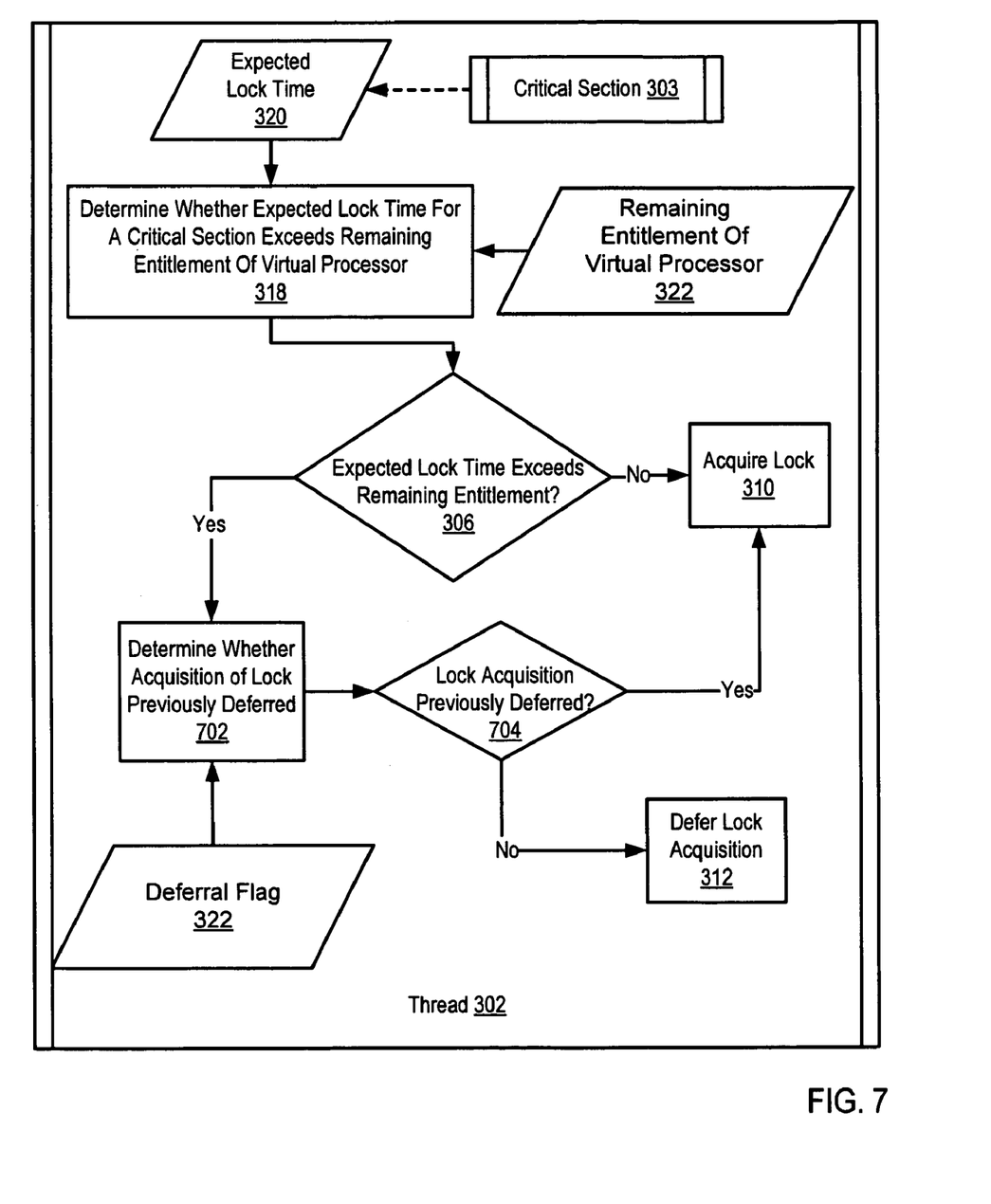
FIG. 7 sets forth a flow chart illustrating a further exemplary method for administration of locks for critical sections of computer programs in a computer that supports a multiplicity of logical partitions.

For further explanation, FIG. 7 sets forth a flow chart illustrating a further exemplary method for administration of locks for critical sections of computer programs in a computer that supports a multiplicity of logical partitions. The method of FIG. 7 is similar to the method of FIG. 5. That is, the method of FIG. 7 includes determining (318) by a thread (302) executing on a virtual processor (510) executing in a time slice (508) on a physical processor (506) whether an expected lock time (320) for a critical section (303) of the thread exceeds a remaining entitlement (322) of the virtual processor in the time slice and deferring (312) acquisition of a lock if the expected lock time (320) exceeds the remaining entitlement (322), all carried out in a manner similar to that of the method of FIG. 5. The method of FIG. 7, however, also includes determining (702) whether acquisition of the lock was previously deferred. A thread may keep track of whether it has previously deferred acquisition of a lock by, for example, setting a deferral flag, such as a Boolean value or an integer to TRUE or to 1, when the thread it defers acquisition of a lock. Such a thread may determine (702) whether acquisition of the lock was previously deferred by examining a deferral flag (322). The method of FIG. 7 also includes acquiring (310) the lock if acquisition of the lock was previously deferred. When the thread acquires a lock, the thread may reset the deferral flag (322) to FALSE or 0.

For further explanation, set forth below is an example in Java-style pseudocode of a thread's deferring acquisition of a lock for a critical section when the thread determines that the expected lock time exceeds the remaining entitlement of the thread's virtual processor in the virtual processor's time slice:

```
// Code for a thread
...
do_u( );
do_v( );
imminentPreemption.nowEnteringCriticalSection( );
myClass.criticalsection( );
do_x( );
do_y( );
do_z( );
...
// Defer Lock If Expected Lock Time Is Greater
// Than Remaining Entitlement Of Virtual Processor
class imminentPreemption {
    public void nowEnteringCriticalSection( ) {
        int expectedLockTime = getExpectedLockTime( );
        int remainingEntitlement = getRemainingEntitlement( );
        boolean deferralFlag = getDeferralFlag( );
        if (!deferralFlag){
            if(ExpectedLockTime > remainingEntitlement){
                deferralFlag = true;
                sleep(remainingEntitlement);
            }
        }
        else deferralFlag = false;
    }
}
// Code for critical section
class myClass {
    synchronized criticalSection( ) {
        do_A( );
        do_B( );
        do_C( );
    }
}
```

This example is described as 'pseudocode' because it is an explanation presented in the general form of Java code rather than an actual working model of Java code. Before calling myClass.criticalSection( ), the thread, improved according to embodiments of the present invention, determines whether to defer the lock by calling imminentPreemption.nowEnteringCriticalSection( ). In nowEnteringCriticalSection( ), getExpectedLockTime( ), getRemainingEntitlement( ), and getDeferralFlag( ) are system calls exposed by an operating system to give a thread access to expected lock time, remaining entitlement of the thread's virtual processor, and a deferral flag respectively. The operating system in turn may obtain these quantities from a hypervisor through similar hypervisor calls.

The statement if(!deferralFlag) tests whether the thread has previously deferred acquisition of the lock. If there is previous deferral, then deferralFlag=TRUE, and nowEnteringCriticalSection( ) clears the deferral flag and exits, allowing the thread that called nowEnteringCriticalSection( ) to acquire the lock. If there has been no previous deferral, nowEnteringCriticalSection( ) tests whether the expected lock time of the lock exceeds the remaining entitlement of the thread's virtual processor with:

if(ExpectedLockTime>remainingEntitlement).

If the expected lock time exceeds the remaining entitlement, then nowEnteringCriticalSection( ) sets the deferral flag and goes to sleep for the period of time identified as 'remainingEntitlement,' deferring acquisition of the lock at least until the thread wakes up. If the expected lock time does not exceed remaining entitlement, nowEnteringCriticalSection( ) returns to its calling thread, allowing the calling thread to acquire the lock without further deferral. After nowEnteringCriticalSection( ) returns, the thread acquires a lock and enters its critical section with a call to the Java synchronized method myClass.criticalSection( ). In this example, myClass.criticalSection( ) is a Java synchronized method that acquires a lock before executing.

For further explanation, set forth below is an example in C-style pseudocode of a thread's deferring acquisition of a lock for a critical section when the thread determines that the expected lock time exceeds the remaining entitlement of the thread's virtual processor in the virtual processor's time slice:

```
/* Code for thread */
...
do__u( );
do__v( );
nowEnteringCriticalSection ( );
acquireLock( );
do__A( ); /* begin critical section */
do__B( );
do__C( ); /* end critical section */
releaseLock( );
do__x( );
do__y( );
do__z( );
...
/* Defer Lock If Expected Lock Time Is Greater    */
/* Than Remaining Entitlement Of Virtual Processor */
void nowEnteringCriticalSection ( ) {
    int expectedLockTime;
    int remainingEntitlement;
    int deferralFlag;
    deferralFlag = getDeferralFlag( );
    expectedLockTime = getExpectedLockTime( );
    remainingEntitlement = getRemainingEntitlement( );
    if(!deferralFlag) {
        if(expectedLockTime > remainingEntitlement){
            deferralFlag = 1;
            sleep(remainingEntitlement);
        }
    }
    else deferralFlag = 0;
}
```

The thread determines whether to defer the lock by calling nowEnteringCriticalSection( ) before entering the thread's critical section. In nowEnteringCriticalSection( ), getExpectedLockTime( ), getRemainingEntitlement( ), and getDeferralFlag( ) are system calls exposed by an operating system to give a thread access to expected lock time, remaining entitlement of the thread's virtual processor, and a deferral flag respectively. The operating system in turn may obtain these quantities from a hypervisor through similar hypervisor calls. The statement if(!deferralFlag) tests whether the thread has previously deferred acquisition of the lock. If there is previous deferral, then deferralFlag=TRUE, and nowEnteringCriticalSection( ) clears the deferral flag and exits, allowing the thread that called nowEnteringCriticalSection( ) to acquire the lock.

If there has been no previous deferral, nowEnteringCriticalSection( ) tests whether the expected lock time of the lock exceeds the remaining entitlement of the thread's virtual processor. If the expected lock time exceeds the remaining entitlement, then nowEnteringCriticalSection( ) sets the deferral flag and goes to sleep for the period of time identified as 'remainingEntitlement,' deferring acquisition of the lock at least until the thread wakes up. If the expected lock time does not exceed remaining entitlement, nowEnteringCriticalSection( ) returns to its calling thread, allowing the calling thread to acquire the lock without further deferral.

After nowEnteringCriticalSection( ) returns, the thread acquires a lock, executes its critical section, releases the lock, and continues processing. Because C does not possess Java synchronized methods, the C thread must explicitly acquire and release a lock upon entering and exiting the critical section, respectively, by the calls to acquireLock( ) and releaseLock( ). AcquireLock( ) and releaseLock( ) may be implemented by program code that respectively acquires and releases a lock in the form of a semaphore, for example.

Exemplary embodiments of the present invention are described largely in the context of a fully functional computer system for administration of locks for critical sections of computer programs in a computer that supports a multiplicity of logical partitions. Readers of skill in the art will recognize, however, that the present invention also may be embodied in a computer program product disposed on recordable media for machine-readable information, including magnetic media, optical media, or other suitable media. Examples of recordable media include magnetic disks in hard drives or diskettes, compact disks for optical drives, magnetic tape, and others as will occur to those of skill in the art. Persons skilled in the art will immediately recognize that any computer system having suitable programming means will be capable of executing the steps of the method of the invention as embodied in a program product. Persons skilled in the art will recognize immediately that, although some of the exemplary embodiments described in this specification are oriented to software installed and executing on computer hardware, nevertheless, alternative embodiments implemented as firmware or as hardware are well within the scope of the present invention.

It will be understood from the foregoing description that modifications and changes may be made in various embodiments of the present invention without departing from its true spirit. The descriptions in this specification are for purposes of illustration only and are not to be construed in a limiting sense. The scope of the present invention is limited only by the language of the following claims.

What is claimed is:

1. A method for administration of locks for critical sections of computer programs in a computer that supports a multiplicity of logical partitions, the method comprising:
   determining by a thread executing on a virtual processor executing in a time slice on a physical processor whether an expected lock time for a critical section of the thread exceeds a remaining entitlement of the virtual processor in the time slice, wherein the expected lock time is provided to the thread by a hypervisor and wherein the expected lock time is calculated as an average lock time for the lock; and
   deferring acquisition of a lock if the expected lock time exceeds the remaining entitlement.

2. The method of claim 1, wherein providing the expected lock time further comprises calculating an average lock time for all locks acquired by all threads executing on the computer.

3. The method of claim 1, further comprising:
   providing, by a hypervisor to the thread, the virtual processor's total entitlement in the time slice;
   identifying, by the hypervisor to the thread, a portion of the entitlement that has been used in the time slice; and
   calculating by the thread the remaining entitlement of the virtual processor in the time slice in dependence upon the virtual processor's total entitlement and the portion of the entitlement that has been used.

4. The method of claim 1, further comprising:
   determining whether acquisition of the lock was previously deferred; and
   acquiring the lock if acquisition of the lock was previously deferred.

5. A system for administration of locks for critical sections of computer programs in a computer that supports a multiplicity of logical partitions, the system comprising a computer processor and a computer memory operatively coupled to the computer processor, the computer memory having disposed within it computer program instructions for:

determining by a thread executing on a virtual processor executing in a time slice on a physical processor whether an expected lock time for a critical section of the thread exceeds a remaining entitlement of the virtual processor in the time slice, wherein the expected lock time is provided to the thread by a hypervisor and wherein the expected lock time is calculated as an average lock time for the lock; and     deferring acquisition of a lock if the expected lock time exceeds the remaining entitlement.

6. The system of claim 5, wherein providing the expected lock time further comprises calculating an average lock time for all locks acquired by all threads executing on the computer.

7. The system of claim 5, further comprising computer program instructions for:

providing, by a hypervisor to the thread, the virtual processor's total entitlement in the time slice;

identifying, by the hypervisor to the thread, a portion of the entitlement that has been used in the time slice; and     calculating by the thread the remaining entitlement of the virtual processor in the time slice in dependence upon the virtual processor's total entitlement and the portion of the entitlement that has been used.

8. The system of claim 5, further comprising computer program instructions for:

determining whether acquisition of the lock was previously deferred; and     acquiring the lock if acquisition of the lock was previously deferred.

9. A computer program product for administration of locks for critical sections of computer programs in a computer that supports a multiplicity of logical partitions, the computer program product disposed upon computer readable storage medium, the computer program product comprising computer program instructions for:

determining by a thread executing on a virtual processor executing in a time slice on a physical processor whether an expected lock time for a critical section of the thread exceeds a remaining entitlement of the virtual processor in the time slice, wherein the expected lock time is provided to the thread by a hypervisor and wherein the expected lock time is calculated as an average lock time for the lock; and     deferring acquisition of a lock if the expected lock time exceeds the remaining entitlement.

10. The computer program product of claim 9, wherein providing the expected lock time further comprises calculating an average lock time for all locks acquired by all threads executing on the computer.

11. The computer program product of claim 9, further comprising computer program instructions for:

providing, by a hypervisor to the thread, the virtual processor's total entitlement in the time slice;

identifying, by the hypervisor to the thread, a portion of the entitlement that has been used in the time slice; and     calculating by the thread the remaining entitlement of the virtual processor in the time slice in dependence upon the virtual processor's total entitlement and the portion of the entitlement that has been used.

12. The computer program product of claim 9, further comprising computer program instructions for:

determining whether acquisition of the lock was previously deferred; and     acquiring the lock if acquisition of the lock was previously deferred.

\* \* \* \* \*